(12) United States Patent
Nakatani et al.

(10) Patent No.: US 10,023,748 B2
(45) Date of Patent: Jul. 17, 2018

(54) FLUORINE-CONTAINING POLYMER POWDER, FILM, AND METHOD FOR PRODUCING FLUORINE-CONTAINING POLYMER POWDER

(75) Inventors: Yasukazu Nakatani, Settsu (JP); Toshio Miyatani, Settsu (JP); Fumiko Shigenai, Settsu (JP); Toshiyuki Kinoshita, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 264 days.

(21) Appl. No.: 14/236,134

(22) PCT Filed: Aug. 29, 2012

(86) PCT No.: PCT/JP2012/071887
§ 371 (c)(1),
(2), (4) Date: Jan. 30, 2014

(87) PCT Pub. No.: WO2013/031858
PCT Pub. Date: Mar. 7, 2013

(65) Prior Publication Data
US 2014/0163159 A1 Jun. 12, 2014

(30) Foreign Application Priority Data

Aug. 29, 2011 (JP) .................. 2011-186490
Mar. 12, 2012 (JP) .................. 2012-054954

(51) Int. Cl.
| | | |
|---|---|---|
| C08J 3/12 | (2006.01) |
| C09D 5/03 | (2006.01) |
| C08F 14/18 | (2006.01) |
| C08F 214/26 | (2006.01) |
| C09D 127/18 | (2006.01) |

(52) U.S. Cl.
CPC .............. *C09D 5/031* (2013.01); *C08F 14/18* (2013.01); *C08F 214/262* (2013.01); *C08J 3/12* (2013.01); *C09D 127/18* (2013.01); *C08J 2327/12* (2013.01)

(58) Field of Classification Search
CPC ....... C09D 5/031; C08F 214/262; C08F 14/18
See application file for complete search history.

(56) References Cited

U.S. PATENT DOCUMENTS

| | | | | |
|---|---|---|---|---|
| 3,150,834 A | * | 9/1964 | Doyle ..................... | B29B 13/10 241/15 |
| 3,241,776 A | * | 3/1966 | Sheldon ................. | B02C 19/00 241/191 |
| 3,655,611 A | * | 4/1972 | Mueller et al. ...... | C08K 3/0033 524/440 |
| 3,855,191 A | * | 12/1974 | Doughty, Jr. ....... | C08F 214/262 526/209 |
| 4,216,265 A | | 8/1980 | Sulzbach | |
| 4,262,101 A | * | 4/1981 | Hartwimmer ....... | C08F 214/262 526/206 |
| 4,914,158 A | * | 4/1990 | Yoshimura ................. | C08J 3/12 428/402 |
| 5,709,944 A | * | 1/1998 | Kokumai ............ | C08F 214/262 428/402 |
| 5,955,556 A | * | 9/1999 | McCarthy ............... | C08F 14/18 526/249 |
| 6,376,647 B1 | | 4/2002 | Tomihashi et al. | |
| 6,870,020 B2 | * | 3/2005 | Aten ................... | C08F 214/262 264/117 |
| 2004/0132914 A1 | * | 7/2004 | Nakatani .................... | C08F 8/20 525/326.2 |
| 2004/0204536 A1 | * | 10/2004 | Miyatani .............. | C09D 127/18 524/545 |
| 2008/0033132 A1 | * | 2/2008 | Schlipf ...................... | B29B 9/02 526/255 |
| 2009/0093602 A1 | * | 4/2009 | Ford .................... | B29C 55/005 526/206 |

FOREIGN PATENT DOCUMENTS

| | | | | |
|---|---|---|---|---|
| CA | 1050717 | | 3/1979 | |
| GB | 1010228 A | * | 11/1965 | ............. C08F 14/26 |
| GB | 1116210 A | * | 6/1968 | ............. C08F 16/24 |
| GB | 1448429 A | * | 9/1976 | ............. C08J 3/122 |
| JP | 53-11296 B | | 4/1978 | |
| JP | 1-118408 A | | 5/1989 | |
| JP | 7-64936 A | | 7/1995 | |
| JP | 8-34820 A | | 2/1996 | |
| JP | 2000-103865 A | | 4/2000 | |

(Continued)

OTHER PUBLICATIONS

Communication dated Mar. 9, 2015 from the European Patent Office in counterpart application No. 12828032.8.

(Continued)

*Primary Examiner* — Nicole M Buie-Hatcher
(74) *Attorney, Agent, or Firm* — Sughrue Mion, PLLC

(57) ABSTRACT

The present invention aims to provide a fluorine-containing polymer powder that is environmentally less harmful and forms a sufficiently smooth film without impairing the properties of the fluorine-containing polymers. The present invention relates to a fluorine-containing polymer powder including a fluorine-containing polymer prepared by suspension polymerization, which contains less than 0.1 ppm of a fluorine-containing surfactant and has an average particle size of not less than 1 μm and less than 100 μm and a bulk density of 0.90 to 1.50 g/cm³.

1 Claim, No Drawings

(56) References Cited

FOREIGN PATENT DOCUMENTS

| JP | 2003-306551 A | 10/2003 |
|----|---------------|---------|
| JP | 3467778 B2 | 11/2003 |
| JP | 2005-298690 A | 10/2005 |
| JP | 2010-144127 A | 7/2010 |

OTHER PUBLICATIONS

English Translation of the International Preliminary Report on Patentability and Written Opinion of the International Searching Authority dated Mar. 4, 2014 for PCT Appln. No. PCT/JP2012/071887.

International Search Report of PCT/JP2012/071887, dated Dec. 4, 2012.

* cited by examiner

FLUORINE-CONTAINING POLYMER POWDER, FILM, AND METHOD FOR PRODUCING FLUORINE-CONTAINING POLYMER POWDER

CROSS REFERENCE TO RELATED APPLICATIONS

This application is a National Stage of International Application No. PCT/JP2012/071887 filed Aug. 29, 2012, claiming priority based on Japanese Patent Application Nos. 2011-186490, filed Aug. 29, 2011 and 2012-054954, filed Mar. 12, 2012, the contents of all of which are incorporated herein by reference in their entirety.

TECHNICAL FIELD

The present invention relates to a fluorine-containing polymer powder used as a coating powder material, a film formed from the powder, and a method for producing the powder.

BACKGROUND ART

A fluorine-containing polymer powder is usable as a coating powder material.

The method for producing a fluorine-containing polymer powder disclosed in Patent Literature 1 is spray-drying of an aqueous dispersion prepared by emulsion polymerization.

In the method disclosed in Patent Literature 2, agglomerated powders of tetrafluoroethylene copolymers prepared by emulsion polymerization are thermally fused at a temperature not higher than the melting point. The resulting substance is then subjected to grinding, heat treatment, and separation by cracking to give a tetrafluoroethylene copolymer powder having a specific melt viscosity of $1 \times 10^4$ to $1 \times 10^6$ poise, an average particle size of 5 to 500 μm, a void ratio of at most 0.75, and a total surface area of 0.2 to 20 $m^2/cm^3$.

Some fluorine-containing surfactants used in emulsion polymerization are environmentally harmful. Such a fluorine-containing surfactant is left in produced powder particles and further left in a film to be formed therefrom, and therefore is environmentally harmful and impairs the physical properties, such as a non-sticking property, of a fluorine resin film.

The method for producing a fluorine-containing polymer powder disclosed in Patent Literature 3 includes: preparing a granulated substance by granulating fluorine-containing polymer particles prepared by solution polymerization or suspension polymerization, in a granulation medium with stirring; grinding the granulated substance to prepare fluorine-containing polymer particles; and heat-treating the fluorine-containing polymer particles in an atmosphere at a temperature of not lower than the melting point thereof, to melt at least a part of the powder.

The method for producing a fluoropolymer powder disclosed in Patent Literature 4 includes: densifying fluoropolymer base powder with rolls under the conditions that enable the specific gravity of the resulting powder to reach at least 90% of the absolute specific gravity; grinding the resulting powder; removing fine particles within a range of 3 to 40% by weight of the entire particle size distribution by airflow classification; and removing coarse particles within a range of 1 to 20% by weight of the entire particle size distribution.

CITATION LIST

Patent Literature

Patent Literature 1: JP-B S53-11296
Patent Literature 2: JP-B H07-64936
Patent Literature 3: JP-A 2000-103865
Patent Literature 4: Japanese Patent No. 3467778

SUMMARY OF INVENTION

Technical Problem

In the case where fluorine-containing polymers are produced by suspension polymerization, since no fluorine-containing surfactant is used in production, an environmental load is small. The fluorine-containing polymer powder prepared by the method disclosed in Patent Literature 3 or 4, however, have failed to forma sufficiently smooth film.

The present invention aims to provide, in consideration of the state of the art, a fluorine-containing polymer powder that is less environmentally harmful and forms a sufficiently smooth film without impairing the properties intrinsic to the fluorine-containing polymer.

Solution to Problem

The present inventors found out that a smooth film can be formed from a fluorine-containing polymer powder that is prepared by suspension polymerization and has a high bulk density, thereby completing the present invention.

That is, the present invention relates to a fluorine-containing polymer powder including a fluorine-containing polymer prepared by suspension polymerization, which contains less than 0.1 ppm of a fluorine-containing surfactant and has an average particle size of not less than 1 μm and less than 100 μm and a bulk density of 0.90 to 1.50 g/cm³. In the present description, such a powder is also referred to as a first fluorine-containing polymer powder of the present invention.

The present invention also relates to a fluorine-containing polymer powder including a fluorine-containing polymer prepared by suspension polymerization, which contains less than 0.1 ppm of a fluorine-containing surfactant and has an average particle size of at least 100 μm but at most 1000 μm and a bulk density of 1.00 to 1.50 g/cm³. In the present description, such a powder is also referred to as a second fluorine-containing polymer powder of the present invention.

The fluorine-containing polymer is preferably at least one selected from the group consisting of tetrafluoroethylene-perfluoro(alkyl vinyl ether) copolymers, tetrafluoroethylene-hexafluoropropylene copolymers, and tetrafluoroethylene-ethylene copolymers.

The present invention also relates to a film formed from the above fluorine-containing polymer powder.

The present invention also relates to a method for producing the above fluorine-containing polymer powder.

Advantageous Effects of Invention

The fluorine-containing polymer powder of the present invention has the constitution as described above, and therefore is less environmentally harmful and forms a smooth film without impairing the properties intrinsic to the fluorine-containing polymer. Accordingly, the fluorine-containing polymer powder of the present invention is suitably used as a coating powder material.

The film of the present invention is formed from the fluorine-containing polymer powder, and therefore has a smooth surface.

The method of the present invention produces a fluorine-containing polymer powder having a high apparent density.

DESCRIPTION OF EMBODIMENTS

The present invention is specifically described in the following.

The first fluorine-containing polymer powder of the present invention is a fluorine-containing polymer powder including a fluorine-containing polymer prepared by suspension polymerization, which contains less than 0.1 ppm of a fluorine-containing surfactant and has an average particle size of not less than 1 µm and less than 100 µm and a bulk density of 0.90 to 1.50 g/cm$^3$. If the average particle size is less than 1 µm, a thick film is less likely to be formed. If the bulk density is less than 0.90 g/cm$^3$, a smooth film cannot be formed.

The first fluorine-containing polymer powder of the present invention has an average particle size of preferably at least 10 µm and more preferably at least 15 µm, but preferably at most 90 µm.

The first fluorine-containing polymer powder of the present invention has a bulk density of preferably at least 0.95 and more preferably at least 1.00, but preferably at most 1.40 and more preferably at most 1.30.

The second fluorine-containing polymer powder of the present invention is a fluorine-containing polymer powder including a fluorine-containing polymer prepared by suspension polymerization, which contains less than 0.1 ppm of a fluorine-containing surfactant and has an average particle size of at least 100 µm and at most 1000 µm and a bulk density of 1.00 to 1.50 g/cm$^3$. If the average particle size is more than 1000 µm, a smooth film cannot be formed. If the bulk density is less than 1.00 g/cm$^3$, a smooth film cannot be formed.

The second fluorine-containing polymer powder of the present invention has an average particle size of preferably at least 150 µm but at most 500 µm.

The fluorine-containing surfactant is a known fluorine-containing surfactant used in emulsion polymerization for preparing fluorine-containing polymers. Any fluorine-containing surfactant may be used, as long as it contains fluorine atoms and has a surface activating ability. Examples thereof include ammonium perfluorooctanoate (PFOA).

The concentration of the fluorine-containing surfactant can be determined as follows. The fluorine-containing surfactant is extracted in acetone from the fluorine-containing polymer powder by Soxhlet extraction, and the concentration thereof is measured using a mass analyzer Quattro micro GC (Nihon Waters K.K.). The detection limit of this measurement is 0.1 ppm, and therefore, the fluorine-containing surfactant in an amount of less than 0.1 ppm refers to the state that the fluorine-containing surfactant in the fluorine-containing polymer powder cannot be detected.

The average particle size is measured using a laser diffraction/scattering particle size analyzer MT3300EXII (NIKKISO CO., LTD.).

The bulk density can be measured in conformity with JIS K 6891.

Fluorine-containing polymers are commercially produced mainly by emulsion polymerization and suspension polymerization. In production of fluorine-containing polymers by emulsion polymerization, dispersions are prepared which include the fluorine-containing polymers present in water as fine particles. Powder particles prepared from this dispersion by spray-drying are spherical and have a high bulk density, with the average particle size of at most 100 µm. A fluorine-containing surfactant used in polymerization, however is environmentally harmful or left in a film formed from the resulting powder, and therefore, properties intrinsic to the fluorine resin film, such as a non-sticking property, may be impaired.

In production of fluorine-containing polymers by suspension polymerization, since no fluorine-containing surfactant is used, an environmental stress is small. However, since fluorine-containing polymers are prepared in the form of amass, spray-drying cannot be employed. The mass may be ground in such a manner as to give powder particles having an average particle size of 10 to 500 µm. Production of spherical particles, however, is not easy, and the bulk density of the resulting particles is low. Removal of fine particles or heat treatment performed on ground particles can increase the bulk density, but the bulk density cannot exceed 0.90 g/cm$^3$.

In the present invention, fluorine-containing polymers used are prepared from suspension-polymerized products. Since no fluorine-containing surfactant is used in suspension polymerization, produced fluorine-containing polymer powder may contain less than 0.1 ppm of a fluorine-containing surfactant. Since a film formed from the fluorine-containing polymer powder of the present invention also contains no fluorine-containing surfactant, such a film is not environmentally harmful and can express properties inherent to the fluorine-containing polymers.

In addition, the fluorine-containing polymer powder of the present invention has a high bulk density that has not been achieved by conventional powders prepared by suspension polymerization. Accordingly, a film formed from the fluorine-containing polymer powder of the present invention can have smooth coating without lowering the properties intrinsic to the fluorine-containing polymer.

The fluorine-containing polymer preferably has an obvious melting point and is preferably a fluorine resin.

The fluorine-containing polymer has a melting point of preferably 100 to 347° C., and more preferably 150 to 322° C.

Here, the melting point of the fluorine-containing polymer is determined, using a differential scanning calorimeter (DSC), as a temperature corresponding to the maximum value of a fusion heat curve recorded during heating at a rate of 10° C./min.

The fluorine-containing polymer is preferably a homopolymer or copolymer having a repeating unit derived from at least one fluorine-containing ethylenic monomer. The fluorine-containing polymer may be prepared by polymerization of a fluorine-containing ethylenic monomer only or by polymerization of a fluorine-containing ethylenic monomer and a fluorine-free ethylenic monomer.

The fluorine-containing polymer preferably has a repeating unit derived from at least one fluorine-containing ethylenic monomer selected from the group consisting of vinyl fluoride [VF], tetrafluoroethylene [TFE], vinylidene fluoride [VdF], chlorotrifluoroethylene [CTFE], hexafluoropropylene [HFP], hexafluoroisobutene, monomers represented by $CH_2=CZ^1(CF_2)_nZ^2$ (in the formula, $Z^1$ represents H or F, $Z^2$ represents H, F, or Cl, and n represents an integer of 1 to 10), perfluoro(alkyl vinyl ether) [PAVE] represented by $CF_2=CF-ORf^1$ (in the formula, $Rf^1$ represents a C1-C8 perfluoroalkyl group), and alkyl perfluorovinyl ether derivatives represented by $CF_2=CF-O-CH_2-Rf^2$ (in the formula, $Rf^2$ represents a C1-C5 perfluoroalkyl group).

The fluorine-containing polymer may have a repeating unit derived from a fluorine-free ethylenic monomer, and may have a repeating unit derived from an ethylenic monomer having a carbon number of at most 5 in another preferable embodiment, from the standpoint of maintaining the heat resistance and chemical resistance. Preferably, the fluorine-containing polymer has at least one fluorine-free ethylenic monomer selected from the group consisting of ethylene, propylene, 1-butene, 2-butene, vinyl chloride, vinylidene chloride, and unsaturated carboxylic acid.

Examples of the fluorine-containing polymer include tetrafluoroethylene [TFE]-perfluoro (alkyl vinyl ether) [PAVE] copolymers [PFA], TFE-hexafluoropropylene [HFP] copolymers [FEP], TFE-ethylene [Et] copolymers [ETFE], TFE-HFP-Et copolymers, TFE-HFP-vinylidenefluoride [VdF] copolymers, TFE-PAVE-chlorotrifluoroethylene [ClTE] copolymers, Et-CTFE copolymers, polytetrafluoroethylene [PTFE], polychlorotrifluoroethylene [PCTFE], polyvinylidene fluoride [PVdF], and polyvinyl fluoride. Each of these fluorine-containing polymers may be used alone, or two or more of these may be used in combination.

The fluorine-containing polymer is preferably at least one selected from the group consisting of PTFE, PCTFE, TFE-Et copolymers, Et-CTFE copolymers, CTFE-TFE copolymers, TFE-HFP copolymers, TFE-PAVE copolymers, and PVdF.

Examples of the PAVE include perfluoro(methyl vinyl ether) [PMVE], perfluoro(ethyl vinyl ether) [PEVE], perfluoro(propyl vinyl ether) [PPVE], and perfluoro(butyl vinylether). Inparticular, PMVE, PEVE, or PPVE is preferable.

The alkyl perfluoro vinyl ether derivatives are preferably those represented by the above formula in which $Rf^2$ represents a C1-C3 perfluoro alkyl group, and is more preferably $CF_2=CF-O-CH_2-CF_2CF_3$.

The fluorine-containing polymer is more preferably a melt-processable fluorine resin, and is still more preferably at least one fluorine resin selected from the group consisting of PFA, FEP, and ETFE.

The PFA is not limited, and is preferably a copolymer in which the molar ratio of the TFE unit and PAVE unit is 70/30 to 99/1 (TFE unit/PAVE unit). The molar ratio is more preferably 80/20 to 98.5/1.5. Too little TFE unit tends to lower the mechanical property and too much TFE unit tends to excessively increase the melting point to lower the moldability. The PFA is also preferably a copolymer in which the monomer unit derived from monomers copolymerizable with TFE and PAVE is 0.1 to 10 mol % and the total of the TFE unit and PAVE unit is 90 to 99.9 mol %. Examples of the monomers copolymerizable with TFE and PAVE include HFP, vinyl monomers represented by $CZ^3Z^4=CZ^5(CF_2)_nZ^6$ (in the formula, $Z^3$, $Z^4$, and $Z^5$ are the same as or different from one another and each represent a hydrogen atom or fluorine atom, $Z^6$ represents a fluorine atom or chlorine atom, and n represents an integer of 2 to 10), and alkyl perfluoro vinyl ether derivatives represented by $CF_2=CF-OCH_2-Rf^7$ (in the formula, $Rf^7$ represents a C1-C5 perfluoroalkyl group).

The FEP is not limited, and is preferably a copolymer in which the molar ratio of the TFE unit and HFP unit is 70/30 to 99/1 (TFE unit/HFP unit). The molar ratio is more preferably 80/20 to 97/3. Too little TFE unit tends to lower the mechanical property and too much TFE unit tends to excessively increase the melting point to lower the moldability. The FEP is also preferably a copolymer in which the monomer unit derived from monomers copolymerizable with TFE and HFP is 0.1 to 10 mol % and the total of the TFE unit and HFP unit is 90 to 99.9 mol %. Examples of the monomer copolymerizable with TFE and HFP include PAVE and alkyl perfluoro vinyl ether derivatives.

The ETFE is preferably a copolymer in which the molar ratio of the TFE unit and ethylene unit is 20/80 to 90/10 (TFE unit/ethylene unit). The molar ratio is more preferably 37/63 to 85/15, and is still more preferably 38/62 to 80/20. The ETFE may also be a copolymer of TFE, ethylene, and a monomer copolymerizable with TFE and ethylene. Examples of the copolymerizable monomer include monomers represented by $CH_2=CX^5Rf^3$, $CF_2=CFRf^3$, $CF_2=CFORf^3$, and $CH_2=C(Rf^3)_2$ (in the formula, $X^5$ represents a hydrogen atom or fluorine atom, and $Rf^3$ represents a fluoroalkyl group which may contain an ether-bond oxygen atom). In particular, fluorine-containing vinyl monomers represented by $CF_2=CFRf^3$, $CF_2=CFORf^3$, and $CH_2=CX^5Rf^3$ are preferable. More preferred are HFP, perfluoro (alkyl vinyl ether) [PAVE] represented by $CF_2=CF-ORf^4$ (in the formula, $Rf^4$ represents a C1-C5 perfluoroalkyl group), and fluorine-containing vinyl monomers represented by $CH_2=CX^5Rf^3$ (in the formula, $Rf^3$ represents a C1-C8 fluoroalkyl group). The monomer copolymerizable with TFE and ethylene may also be an aliphatic unsaturated carboxylic acid such as itaconic acid or itaconic anhydride. The amount of the monomer copolymerizable with TFE and ethylene is preferably 0.1 to 10 mol %, more preferably 0.1 to 5 mol %, and particularly preferably 0.2 to 4 mol %, relative to the amount of the fluorine-containing polymer.

The amount of each monomer in the copolymer can be obtained by appropriately combining the techniques of NMR, FT-IR, elemental analysis, and fluorescent X-ray analysis, in accordance with the kind of the monomers.

The fluorine-containing polymer powder of the present invention is favorably used as a coating powder material. A coating powder material made of the fluorine-containing polymer powder of the present invention can form a film with a smooth surface when applied to a base material. Fluorine-containing polymer powder having an average particle size of not less than 1 μm and less than 100 μm is suitably used as a coating powder material for electrostatic coating. Fluorine-containing polymer powder having an average particle size of not less than 100 μm and not more than 1000 μm is suitably used as a coating powder material for rotational lining or rotational molding.

A method for producing the fluorine-containing polymer powder of the present invention is another aspect of the present invention.

The production method of the present invention preferably includes the steps of:

polymerizing fluorine-containing ethylenic monomers by suspension polymerization to prepare fluorine-containing polymer powder;

optionally densifying the polymer powder with a roll mill under the conditions that enable the specific gravity of the resulting powder to reach at least 90% of the absolute specific gravity, to prepare ground powder;

putting the polymer powder or ground powder into an attrition mill;

processing the polymer powder or ground powder into a desired shape; and collecting the fluorine-containing polymer powder from the attrition mill.

The fluorine-containing polymer powder produced by the above method is processed to have a desired shape in the treatment using an attrition mill, and therefore is spherical and has a high bulk density. The above method is more productive than conventional methods, and provides powder particles with a high bulk density at a high yield.

Attrition Mill

An attrition mill is an apparatus including a drum and plural blades provided on a rotational shaft inside the drum, wherein the plural blades rotates to cause centrifugal dispersion and stirring current, thereby fluidizing powder in the drum. Powder pressed against the inner wall of the apparatus is subjected to a mechanical stress. A stirring member may be used for guiding the powder back and forth along the rotational shaft. The treatment is preferably performed on the fluorine-containing polymer powder at a powder temperature of 50 to 200° C.

Preferably, the attrition mill includes: a rotational body having plural blades on its periphery; and a casing with the inner face close to the blades at the end portions thereof in the radial direction of the rotational body, in which the blades adjacent to each other in the axial direction of the rotational body are extended from the shaft in different directions and at least one pair of blades adjacent to each other in the axial direction are inclined relative to the shaft in the opposite directions. Examples of such an apparatus include the apparatus disclosed in JP-A 2010-180099.

In such an apparatus, powder is subjected to a strong compression force and shear force between the end portions of the plural blades in the radial direction and the inner face of the casing. Accordingly, powder having a high bulk density is effectively produced.

Examples of such an apparatus include NOBILTA produced by HOSOKAWA MICRON CORPORATION.

Powder obtained by suspension polymerization may be directly put into the attrition mill. Alternatively, the powder may be put into the attrition mill after being densified and ground using a roll mill or the like. Moreover, the powder may be put into the attrition mill after being mixed with another fluorine-containing polymer. The fluorine-containing polymer powder may be put into the attrition mill after being mixed with additives other than fluorine-containing polymers, provided that the properties intrinsic to the fluorine-containing polymer are not impaired. For example, PFA may be mixed with at most 1% by weight of PTFE. Alternatively, PFA or ETFE may be mixed with at most 1% by weight of a metal compound containing copper, zinc, cobalt, or the like.

For enhancing the handleability of the fluorine-containing polymer powder, classification may be performed to narrow the particle size distribution.

The present invention also relates to a film formed from the fluorine-containing polymer powder.

The film of the present invention is not only excellent in surface smoothness but also environmentally less harmful because no fluorine-containing surfactant is contained therein, and therefore has properties intrinsic to the fluorine-containing polymer, such as a non-sticking property.

The film of the present invention is formed by application of the fluorine-containing polymer powder to a base material. Exemplary application methods include a method by electrostatic coating and a method by rotational lining or rotational molding.

In the method by electrostatic coating, powder particles electrically charged at the top of a coating gun are discharged from the gun to a base material, and the applied particles are fired, thereby forming a film. In this case, a preferable average particle size is not less than 1 μm and less than 100 μm.

In the method by rotational lining or rotational molding, powder particles are put into a hollow mold, and the mold was rotated in the firing furnace, thereby forming a film on the inner wall of the mold. In this case, a preferable average particle size is at least 100 μm but at most 1000 μm.

The fluorine-containing polymer powder and the film of the present invention can be used for various applications, such as kitchen utensils (e.g., frying pan), home electronic appliances (e.g., rice cooker), belts and rolls used in OA devices including printers and copying machines, and corrosion-resisting linings of pipes, tanks, or the like used in various plants.

EXAMPLES

The present invention is described with reference to, but not limited to, examples.

Numerical values of examples and comparative examples were determined by the following methods.

Bulk Density

The bulk density was determined in conformity with JIS K 6891.

Average Particle Size (Particle Size Distribution)

The average particle size was determined using a laser diffraction/scattering particle size analyzer MT3300EXII (NIKKISO CO., LTD.).

Concentration of Fluorine-Containing Surfactant

The concentration of the fluorine-containing surfactant was determined as follows. The fluorine-containing surfactant was extracted in acetone from the fluorine-containing polymer powder by Soxhlet extraction, and the concentration thereof was measured using a mass analyzer Quattro micro GC (Nihon Waters K.K.).

Thickness of Film

The thickness of a film formed by electrostatic coating or rotational molding was determined using an electromagnetic thickness meter SWT-8100 type (SANKO ELECTRONIC LABORATORY CO., LTD.).

Surface Smoothness of Film

The center line average roughness (Ra) of a film formed by electrostatic coating or rotational molding was determined using a surface texture and contour measuring instrument SURFCOM 470A (Tokyo Seimitsu Co., Ltd.).

The following devices (a) to (d) were used in examples and comparative examples.
(a) High speed fluidizing mixer: Super mixer (KAWATA MFG Co., Ltd.)
(b) High-speed rotary pulverizer: Hybridization system (NARA MACHINERY CO., LTD.)
(c) Attrition mill: NOBILTA (HOSOKAWA MICRON CORPORATION)
(d) Heated air-type surface modifier: METEOR RAINBOW (NIPPON PNEUMATIC MFG. CO., LTD.)

Comparative Example 1

A tetrafluoroethylene-perfluoro(propyl vinyl ether) copolymer [PFA] (absolute specific gravity of 2.15, melting point of 304° C., molar ratio of 98/2 (TFE/PPVE)) prepared by suspension polymerization was compressed using a roller compactor BSC-25 type (SINTOKOGIO, LTD.) in such a manner that the resulting sheet has an absolute specific gravity of at least 90%, thereby forming a 60 mm-wide and 5 mm-thick sheet. The sheet was cracked to have a diameter of about 10 mm using a cracking machine that comes with the roller compactor, and then ground using a mill Cosmomizer N-1 type (NARA MACHINERY CO., LTD.). The resulting substance was processed using a high speed fluidizing mixer (a), Super mixer (KAWATAMFG Co., Ltd.), to give fluorine-containing polymer powder having a bulk density of 0.85 g/cm$^3$ and an average particle size of 24 μm. The concentration of the fluorine-containing surfactant in the powder was less than 0.1 ppm and could not be determined. A 36 μm-thick film formed from the powder by electrostatic coating had a Ra (surface smoothness) of 0.38 μm.

Comparative Example 2

The fluorine-containing polymer powder shown in Table 1 was produced in the same manner as in Comparative Example 1. The concentration of the fluorine-containing surfactant in the powder, and the thickness and Ra of a film formed from the powder by electrostatic coating were as shown in Table 1.

Comparative Example 3

The fluorine-containing polymer powder shown in Table 1 was produced in the same manner as in Comparative Example 1. The concentration of the fluorine-containing surfactant in the powder, and the thickness and Ra of a film formed from the powder by rotational lining were as shown in Table 1.

Comparative Examples 4 to 6

The fluorine-containing polymer powders shown in Table 1 were produced in the same manner as in Comparative Examples 1 to 3, except that the high speed fluidizing mixer (a), Super mixer (KAWATA MFG Co., Ltd.), was changed to the high-speed rotary pulverizer (b), Hybridization system (NARA MACHINERY CO., LTD.). The concentration of the fluorine-containing surfactant in each powder, and the thickness and Ra of a film formed from each powder were as shown in Table 1.

Examples 1 to 3

The fluorine-containing polymer powders shown in Table 1 were produced in the same manner as in Comparative Examples 1 to 3, except that the high speed fluidizing mixer (a), Super mixer (KAWATAMFG Co., Ltd.), was changed to the attrition mill (C), NOBILTA (HOSOKAWA MICRON CORPORATION). The concentration of the fluorine-containing surfactant in each powder, and the thickness and Ra of a film formed from each powder were as shown in Table 1.

Comparative Examples 7 to 9

The fluorine-containing polymer powders shown in Table 1 were produced in the same manner as in Comparative Examples 1 to 3, except that the high speed fluidizing mixer (a), Super mixer (KAWATAMFG Co., Ltd.), was changed to the heated air-type surface reformer (d), METEOR RAINBOW (NIPPON PNEUMATIC MFG. CO., LTD.). The concentration of the fluorine-containing surfactant in each powder, and the thickness and Ra of a film formed from each powder were as shown in Table 1.

Comparative Examples 10 to 11

The fluorine-containing polymer powders shown in Table 1 were produced in the same manner as in Comparative Examples 1 and 3, except that the tetrafluoroethylene-perfluoro(propyl vinyl ether) copolymer was changed to a tetrafluoroethylene-ethylene copolymer (ETFE) (absolute specific gravity of 1.85, melting point of 254° C., molar ratio of 56/42/2 (TFE/ethylene/(perfluorobutyl)ethylene)). The concentration of the fluorine-containing surfactant in each powder, and the thickness and Ra of a film formed from each powder by electrostatic coating or rotational molding were as shown in Table 1.

Comparative Examples 12 and 13

The fluorine-containing polymer powders shown in Table 1 were produced in the same manner as in Comparative Examples 4 and 6, except that the tetrafluoroethylene-perfluoro(propyl vinyl ether) copolymer was changed to a tetrafluoroethylene-ethylene copolymer (ETFE) (absolute specific gravity of 1.85, melting point of 254° C., molar ratio of 56/42/2 (TFE/ethylene/(perfluorobutyl)ethylene)). The concentration of the fluorine-containing surfactant in each powder, and the thickness and Ra of a film formed from each powder by electrostatic coating or rotational molding were as shown in Table 1.

Examples 4 and 5

The fluorine-containing polymer powders shown in Table 1 were produced in the same manner as in Examples 1 and 3, except that the tetrafluoroethylene-perfluoro(propyl vinyl ether) copolymer was changed to a tetrafluoroethylene-ethylene copolymer [ETFE] (absolute specific gravity of 1.85, melting point of 254° C., molar ratio of 56/42/2 (TFE/ethylene/(perfluorobutyl)ethylene)). The concentration of the fluorine-containing surfactant in each powder, and the thickness and Ra of a film formed from each powder by electrostatic coating or rotational molding were as shown in Table 1.

Comparative Examples 14 and 15

The fluorine-containing polymer powders shown in Table 1 were produced in the same manner as in Comparative Examples 7 and 9, except that the tetrafluoroethylene-perfluoro(propyl vinyl ether) copolymer was changed to a tetrafluoroethylene-ethylene copolymer [ETFE] (absolute specific gravity of 1.85, melting point of 254° C., molar ratio of 56/42/2 (TFE/ethylene/(perfluorobutyl)ethylene)). The concentration of the fluorine-containing surfactant in each powder, and the thickness and Ra of a film formed from each powder by electrostatic coating or rotational molding were as shown in Table 1.

Comparative Examples 16

The fluorine-containing polymer powder shown in Table 1 was produced in the same manner as in Comparative Example 1, except that the tetrafluoroethylene-perfluoro(propyl vinyl ether) copolymer was changed to a tetrafluoroethylene-hexafluoropropylene copolymer [FEP] (absolute specific gravity of 2.15, melting point of 269° C., molar ratio of 90/10 (TFE/HFP)). The concentration of the fluorine-containing surfactant in the powder, and the thickness and Ra of a film formed from the powder by electrostatic coating were as shown in Table 1.

Comparative Example 17

The fluorine-containing polymer powder shown in Table 1 was produced in the same manner as in Comparative Example 4, except that the tetrafluoroethylene-perfluoro (propyl vinyl ether) copolymer was changed to a tetrafluoroethylene-hexafluoropropylene copolymer [FEP] (absolute specific gravity of 2.15, melting point of 269° C., molar ratio of 90/10 (TFE/HFP)). The concentration of the fluorine-containing surfactant in the powder, and the thickness and Ra of a film formed from the powder by electrostatic coating were as shown in Table 1.

Example 6

The fluorine-containing polymer powder shown in Table 1 was produced in the same manner as in Example 1, except that the tetrafluoroethylene-perfluoro(propyl vinyl ether) copolymer was changed to a tetrafluoroethylene-hexafluoropropylene copolymer (FEP) (absolute specific gravity of 2.15, melting point of 269° C., molar ratio of 90/10 (TFE/HFP)). The concentration of the fluorine-containing surfactant in the powder, and the thickness and Ra of a film formed from the powder by electrostatic coating were as shown in Table 1.

Comparative Example 18

The fluorine-containing polymer powder shown in Table 1 was produced in the same manner as in Comparative Example 7, except that the tetrafluoroethylene-perfluoro (propyl vinyl ether) copolymer was changed to a tetrafluoroethylene-hexafluoropropylene copolymer [FEP] (absolute specific gravity of 2.15, melting point of 269° C., molar ratio of 90/10 (TFE/HFP)). The concentration of the fluorine-containing surfactant in the powder, and the thickness and Ra of a film formed from the powder by electrostatic coating were as shown in Table 1.

Comparative Example 19

The fluorine-containing polymer powder shown in Table 1 was produced by a treatment using a Mini Spary Dryer B-290 (BUCHI Corporation) performed on a tetrafluoroethylene-perfluoro (propyl vinyl ether) copolymer [PFA] (absolute specific gravity of 2.15, melting point of 304° C., molar ratio of 98/2 (TFE/PPVE)) prepared by emulsion polymerization. The concentration of the fluorine-containing surfactant in the powder, and the thickness and Ra of a film formed from the powder by electrostatic coating were as shown in Table 1.

Comparative Example 20

The fluorine-containing polymer powder shown in Table 1 was produced as described below. A ground fluorine-containing polymer prepared by compression, cracking, and grinding in the same manner as in Comparative Example 1 was placed on a stainless-steel tray to the thickness of 2 to 4 cm, and then heated at 300° C. for five hours. The resulting substance was separated by cracking using a cooking mixer, thereby producing the fluorine-containing polymer powder shown in Table 1. The concentration of the fluorine-containing surfactant in the powder, and the thickness and Ra of a film formed from the powder by electrostatic coating were as shown in Table 1.

Comparative Example 21

The fluorine-containing polymer powder shown in Table 1 was produced as described below. Aground fluorine-containing polymer prepared by compression, cracking, and grinding in the same manner as in Comparative Example 1 was placed on a stainless-steel tray to the thickness of 2 to 4 cm, and then heated at 300° C. for five hours. The resulting substance was separated by cracking using a cooking mixer, thereby producing the fluorine-containing polymer powder shown in Table 1. The concentration of the fluorine-containing surfactant in the powder, and the thickness and Ra of a film formed from the powder by rotational lining were as shown in Table 1.

Comparative Examples 22 and 23

The fluorine-containing polymer powders shown in Table 1 were produced in the same manner as in Comparative Examples 20 and 21, except that the tetrafluoroethylene-perfluoro(propyl vinyl ether) copolymer was changed to a tetrafluoroethylene-ethylene copolymer [ETFE] (absolute specific gravity of 1.85, melting point of 254° C., molar ratio of 56/42/2 (TFE/ethylene/(perfluorobutyl)ethylene) and that the heating temperature was changed from 300° C. to 210° C. The concentration of the fluorine-containing surfactant in each powder, and the thickness and Ra of a film formed from each powder by electrostatic coating or rotational molding were as shown in Table 1.

Comparative Example 24

The fluorine-containing polymer powder shown in Table 1 was produced in the same manner as in Comparative Example 20, except that the tetrafluoroethylene-perfluoro (propyl vinyl ether) copolymer was changed to a tetrafluoroethylene-hexafluoropropylene copolymer [FEP] (absolute specific gravity of 2.15, melting point of 269° C., molar ratio of 90/10 (TFE/HFP)) and that the heating temperature was changed from 300° C. to 250° C. The concentration of the fluorine-containing surfactant in the powder, and the thickness and Ra of a film formed from the powder by electrostatic coating were as shown in Table 1.

TABLE 1

| | Fluorine-containing polymer | Polymerization method | Processing device | Bulk density (g/cm$^3$) | Average particle size (μm) | Concentration of fluorine-containing surfactant (ppm) | Film thickness (μm) | Surface smoothness (μm) |
|---|---|---|---|---|---|---|---|---|
| Comparative Example 1 | PFA | Suspension | (a) High speed fluidizing mixer | 0.85 | 24 | less than 0.1 ppm | 36 | 0.38 |
| Comparative Example 2 | | | | 0.88 | 78 | less than 0.1 ppm | 87 | 0.77 |
| Comparative Example 3 | | | | 0.98 | 293 | less than 0.1 ppm | 970 | 0.70 |
| Comparative Example 4 | | | (b) High-speed rotary pulverizer | 0.87 | 39 | less than 0.1 ppm | 40 | 0.34 |

TABLE 1-continued

| | Fluorine-containing polymer | Polymerization method | Processing device | Bulk density (g/cm³) | Average particle size (μm) | Concentration of fluorine-containing surfactant (ppm) | Film thickness (μm) | Surface smoothness (μm) |
|---|---|---|---|---|---|---|---|---|
| Comparative Example 5 | | | | 0.86 | 62 | less than 0.1 ppm | 89 | 0.74 |
| Comparative Example 6 | | | | 0.91 | 224 | less than 0.1 ppm | 950 | 0.74 |
| Example 1 | | | (c) Attrition mill | 1.13 | 27 | less than 0.1 ppm | 35 | 0.33 |
| Example 2 | | | | 1.09 | 71 | less than 0.1 ppm | 94 | 0.72 |
| Example 3 | | | | 1.19 | 210 | less than 0.1 ppm | 980 | 0.69 |
| Comparative Example 7 | | | (d) Surface modifier by heat flow | 0.79 | 25 | less than 0.1 ppm | 33 | 0.39 |
| Comparative Example 8 | | | | 0.81 | 79 | less than 0.1 ppm | 90 | 0.79 |
| Comparative Example 9 | | | | 0.78 | 263 | less than 0.1 ppm | 910 | 0.84 |
| Comparative Example 10 | ETFE | | (a) High speed fluidizing mixer | 0.84 | 84 | less than 0.1 ppm | 93 | 0.63 |
| Comparative Example 11 | | | | 0.88 | 277 | less than 0.1 ppm | 2840 | 0.16 |
| Comparative Example 12 | | | (b) High-speed rotary pulverizer | 0.85 | 67 | less than 0.1 ppm | 85 | 0.66 |
| Comparative Example 13 | | | | 0.97 | 255 | less than 0.1 ppm | 2950 | 0.14 |
| Example 4 | | | (c) Attrition mill | 0.98 | 72 | less than 0.1 ppm | 89 | 0.61 |
| Example 5 | | | | 1.04 | 304 | less than 0.1 ppm | 2890 | 0.10 |
| Comparative Example 14 | | | (d) Heated air type surface modifier | 0.77 | 88 | less than 0.1 ppm | 86 | 0.67 |
| Comparative Example 15 | | | | 0.78 | 213 | less than 0.1 ppm | 2920 | 0.14 |
| Comparative Example 16 | FEP | | (a) High speed fluidizing mixer | 0.84 | 24 | less than 0.1 ppm | 31 | 0.29 |
| Comparative Example 17 | | | (b) High-speed rotary pulverizer | 0.88 | 36 | less than 0.1 ppm | 32 | 0.29 |
| Example 6 | | | (c) Attrition mill | 1.01 | 31 | less than 0.1 ppm | 33 | 0.24 |
| Comparative Example 18 | | | (d) Heated air-type surface modifier | 0.78 | 32 | less than 0.1 ppm | 30 | 0.31 |
| Comparative Example 19 | PFA | Emulsion | Spary-drying | 0.90 | 25 | 0.1 | 34 | 0.33 |
| Comparative Example 20 | | Suspension | Heat treatment at the melting point or lower | 0.80 | 24 | less than 0.1 ppm | 32 | 0.44 |
| Comparative Example 21 | | | | 0.90 | 224 | less than 0.1 ppm | 960 | 1.03 |
| Comparative Example 22 | ETFE | | | 0.78 | 73 | less than 0.1 ppm | 91 | 0.74 |
| Comparative Example 23 | | | | 0.87 | 206 | less than 0.1 ppm | 2860 | 0.17 |
| Comparative Example 24 | FEP | | | 0.87 | 24 | less than 0.1 ppm | 30 | 0.42 |

The invention claimed is:

1. A method for producing a fluorine-containing polymer powder comprising a fluorine-containing polymer prepared by suspension polymerization,
wherein the fluorine-containing polymer powder contains less than 0.1 ppm of a fluorine-containing surfactant and has an average particle size of at least 100 μm but at most 1000 μm and a bulk density of 1.00 to 1.50 g/cm³,
wherein the fluorine-containing polymer is at least one selected from the group consisting of tetrafluoroethylene-perfluoro(alkyl vinyl ether) copolymers, tetrafluoroethylene-hexafluoropropylene copolymers, and tetrafluoroethylene-ethylene copolymers,
wherein the tetrafluoroethylene-perfluoro (alkyl vinyl ether) copolymer is a copolymer in which the molar ratio of tetrafluoroethylene (TFE) unit and perfluoro (alkyl vinyl ether)(PAVE) unit (TFE unit/PAVE unit) is 80/20 to 98/2, and
(i) consists of TFE unit and PAVE unit, or
(ii) comprises TFE unit, PAVE unit and a monomer unit derived from a monomer copolymerizable with TFE and PAVE wherein the total of the TFE unit and PAVE unit is 90 to 99.9 mol % and the monomer unit derived from a monomer copolymerizable with TFE and PAVE is 0.1 to 10 mol %,
wherein tetrafluoroethylene-hexafluoropropylene copolymer is a copolymer in which the molar ratio of TFE unit and hexafluoropropylene (HFP) unit (TFE unit/HFP unit) is 80/20 to 97/3, and
(iii) consists of TFE unit and HFP unit, or
(iv) comprises TFE unit, HFP unit and a monomer unit derived from a monomer copolymerizable with TFE and HFP wherein the total of the TFE unit and HFP unit is 90 to 99.9 mol % and the monomer unit derived from a monomer copolymerizable with TFE and HFP is 0.1 to 10 mol %, and
wherein the fluorine-containing polymer is a melt-processible fluorine resin,
the method comprising:
polymerizing fluorine-containing ethylenic monomers by suspension polymerization to prepare fluorine-containing polymer powder;
optionally densifying the polymer powder with a roll mill under the conditions that enable the specific gravity of the resulting powder to reach at least 90% of the absolute specific gravity, to prepare ground powder;

putting the polymer powder or ground powder into an attrition mill;

processing the polymer powder or ground powder into a desired shape; and collecting the fluorine-containing polymer powder from the attrition mill.

* * * * *